United States Patent
Yokohata et al.

(10) Patent No.: US 7,554,577 B2
(45) Date of Patent: Jun. 30, 2009

(54) SIGNAL PROCESSING DEVICE

(75) Inventors: Masahiro Yokohata, Osaka (JP); Yoshitaka Anada, Higashiosaku (JP); Seiji Okada, Hirakata (JP); Yukio Mori, Hirakata (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 763 days.

(21) Appl. No.: 11/236,628

(22) Filed: Sep. 28, 2005

(65) Prior Publication Data

US 2006/0066737 A1    Mar. 30, 2006

(30) Foreign Application Priority Data

| Sep. 29, 2004 | (JP) | ............................. 2004-284266 |
| Mar. 18, 2005 | (JP) | ............................. 2005-078425 |
| Aug. 24, 2005 | (JP) | ............................. 2005-242424 |

(51) Int. Cl.
    *H04N 5/228* (2006.01)

(52) U.S. Cl. ................................. 348/222.1

(58) Field of Classification Search ............. 348/222.1, 348/218.1, 229.1, 311
    See application file for complete search history.

(56) References Cited

U.S. PATENT DOCUMENTS

| 6,072,603 | A  * | 6/2000  | Parks .......................... 358/504   |
| 6,791,615 | B1 * | 9/2004  | Shiomi et al. ................ 348/323     |
| 7,019,775 | B2 * | 3/2006  | Matsumoto ................ 348/220.1       |
| 7,050,098 | B2 * | 5/2006  | Shirakawa et al. .......... 348/245        |
| 7,106,370 | B2 * | 9/2006  | Shiomi et al. ................ 348/241     |
| 7,218,351 | B2 * | 5/2007  | Miyahara et al. ............ 348/313       |
| 7,245,318 | B2 * | 7/2007  | Shirakawa ................ 348/218.1       |
| 7,362,358 | B2 * | 4/2008  | Nakayama ................ 348/229.1        |
| 7,379,104 | B2 * | 5/2008  | Hattori et al. ................ 348/241    |
| 7,433,547 | B2 * | 10/2008 | Yamamoto ................... 382/309       |
| 2003/0164885 | A1 |  9/2003 | Tanaka et al.                              |
| 2004/0257451 | A1 | 12/2004 | Yamamoto                                   |

FOREIGN PATENT DOCUMENTS

| CN | 1574889 A | 2/2005 |
| JP | 2001-094886 A | 4/2001 |
| JP | 2002-125149 | 4/2002 |
| JP | 2002-142158 | 5/2002 |
| JP | 2002-252808 A | 9/2002 |
| JP | 2003-18472 | 1/2003 |
| WO | WO 2004/019608 A1 | 3/2004 |

OTHER PUBLICATIONS

Chinese Office Action dated Feb. 15, 2008, issued in corresponding Chinese Patent Application No. 2005-10106876.5 with English translation.
Japanese Office Action dated Jul. 31, 2008, issued in corresponding Japanese Patent Application No. 2005-242424.

* cited by examiner

*Primary Examiner*—Justin P Misleh
(74) *Attorney, Agent, or Firm*—Westerman, Hattori, Daniels & Adrian, LLP.

(57) ABSTRACT

The gain is derived by deriving, from the signals of the two same filter pixels in one divided region, a predicted value of a signal of one same filter pixel in the other divided region based on a plurality of same color filter pixels near the boundary of the divided regions for each horizontal line in one screen and comparing the derived predicted value and an actual signal value of the relevant pixel.

6 Claims, 13 Drawing Sheets

FIG. 5

| COMBINATION | sel1 | sel2 | sel3 |
|---|---|---|---|
| 1 | reg3 | reg1 | reg5 |
| 2 | reg4 | reg2 | reg6 |
| 3 | reg6 | reg8 | reg4 |
| 4 | reg5 | reg7 | reg3 |

FIG. 13
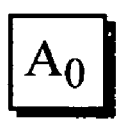

SIGNAL PROCESSING DEVICE

BACKGROUND OF THE INVENTION

1. Field of the Invention

The present invention relates to a signal processing device for correcting the output signal level difference between each divided region when an imaging region of an imaging element in a digital camera, for example, is divided into a plurality of regions in the left and right directions, and a process of simultaneously reading the data for each divided region and combining the data is performed.

2. Description of the Related Art

In a digital camera, a 2ch CCD with a device configuration of 2-output type in which the CCD is divided into two left and right regions and the respective signal is output is being developed to improve the read-out speed of the CCD when taking moving image or when taking rapid serial pictures.

In the 2ch CCD, due to the precision difference of a CDS/AGC circuit arranged for each left and right imaging region, the left and right output signals do not match. Further, even if means for matching the left and right output signals in a fixed manner is provided, the possibility of the temperature characteristic and the like of the left and right CDS/AGC circuits being the same is low, and thus matching the left and right output signal levels is difficult.

As a method of correcting the output signal level difference between the channels, a method of imaging a planar image by emitting LED on the inner side of the shutter with the shutter in a closed state before photographing, measuring the signal level difference between the channels of the CCD, and correcting the signal level difference between the channels of the CCD has already been developed. However, although this method is effective in intermittent photographing such as when taking a still image, an appropriate correction can not be performed when performing continuous photographing as when taking a moving image or when the output signal level difference between the channels changes by the temperature rise while photographing.

SUMMARY OF THE INVENTION

The present invention aims to provide a signal processing device for correcting the output signal level difference between channels not only in photographing the still image but also in photographing the moving image.

A first signal processing device according to the present invention comprises an imaging element in which an imaging region is divided into two left and right regions, and an electric signal is read for each divided region; synthesis means for synthesizing the electric signal read from the imaging element to generate signals for one screen; gain deriving means for deriving a gain for one divided region defined in advance for each horizontal line in one screen based on the signals of a plurality of pixels near the boundary of the divided regions out of the signals for one screen generated by the synthesis means; average value deriving means for deriving an average value of the gain derived for each horizontal line in one screen by the gain deriving means; and correcting means for correcting a signal level difference between the both divided regions by multiplying the gain average value derived by the average value deriving means to the signal in one divided region defined in advance out of the signals for one screen output from the synthesis means; wherein the gain deriving means derives the gain by deriving, from the signals of two same filter pixels of one divided region, a predicted value of the signal of one same filter pixel of the other divided region based on the signals of a plurality of same color filter pixels near the boundary of the divided region for each horizontal line in one screen, and comparing the derived predicted value and an actual signal value of the relevant pixel.

A second signal processing device according to the present invention comprises an imaging element in which an imaging region is divided into two left and right regions, and an electric signal is read for each divided region; synthesis means for synthesizing the electric signal read from the imaging element to generate signals for one screen; smoothing means for performing a low pass filter process in the vertical direction on the signal of each pixel of a gain deriving region near the boundary of the divided regions in one screen generated by the synthesis means; gain deriving means for deriving a gain for one divided region defined in advance for each horizontal line in the gain deriving region based on the signal after filter processing of the gain deriving region obtained by the smoothing means; average value deriving means for deriving an average value of the gain derived for each horizontal line in the gain deriving region by the gain deriving means; and correcting means for correcting a signal level difference between the both divided regions by multiplying the gain average value derived by the average value deriving means to the signal in the one divided region defined in advance out of the signals for one screen output from the synthesis means; wherein the gain deriving means derives the gain by deriving, from the signals of two same filter pixels of one divided region, a predicted value of the signal of one same filter pixel of the other divided region based on the signals of a plurality of same color filter pixels near the boundary of the divided regions for each horizontal line in the gain deriving region, and comparing the derived predicted value and an actual signal value of the relevant pixel.

A third signal processing device according to the present invention comprises an imaging element in which an imaging region is divided into two left and right regions, and an electric signal is read for each divided region; synthesis means for synthesizing the electric signal read from the imaging element to generate signals for one screen; gain deriving means for deriving a gain for one divided region defined in advance for each horizontal line in one screen based on the signals of a plurality of pixels near the boundary of the divided regions out of the signals for one screen generated by the synthesis means; first average value deriving means for deriving an average value of the gain derived for each horizontal line in one screen by the gain deriving means; second average value deriving means for deriving an average value of the gain for the horizontal line in which a signal value of the pixel near the boundary of the divided region is less than or equal to a first predetermined value out of the gains derived for each horizontal line in one screen by the gain deriving means; and correcting means for correcting a signal level difference between both divided regions by, out of the signals in one divided region defined in advance in the signals for one screen output from the synthesis means, multiplying the gain average value obtained by the second average value deriving means for the signal having the signal value of less than or equal to a second predetermined value, multiplying the gain average value obtained by the first average value deriving means for the signal having the signal value of greater than or equal to a third predetermined value greater than the second predetermined value, and multiplying a value obtained by weighing and adding the gain average value obtained by the first average value deriving means and the gain average value obtained by the second average deriving means according to the relevant signal value for the signal having the signal value between the second predetermined value and the third predetermined value; wherein the gain deriving means derives the gain by deriving, from the signals of two same filter pixels of one divided region, a predicted value of the signal of one same filter pixel of the other divided region based on the signals of a plurality of same color filter pixels near the boundary of the divided regions for each horizontal line in one screen, and comparing the derived predicted value and an actual signal value of the relevant pixel.

A fourth signal processing device according to the present invention comprises an imaging element in which an imaging region is divided into two left and right regions, and an electric signal is read for each divided region; synthesis means for synthesizing the electric signal read from the imaging element to generate signals for one screen; smoothing means for performing a low pass filter process in the vertical direction on the signal of each pixel of a gain deriving region near the boundary of the divided regions in one screen generated by the synthesis means; gain deriving means for deriving a gain for one divided region defined in advance for each horizontal line in the gain deriving region based on the signal after filter processing of the gain deriving region obtained by the smoothing means; first average value deriving means for deriving an average value of the gain derived for each horizontal line in the gain deriving region by the gain deriving means; second average value deriving means for deriving an average value of the gain of the horizontal line in which a signal value of the pixel near the boundary of the divided regions is less than or equal to a first predetermined value out of the gains derived for each horizontal line in the gain deriving region by the gain deriving means; and correcting means for correcting a signal level difference between both divided regions by, out of the signals in one divided region defined in advance in the signals for one screen output from the synthesis means, multiplying the gain average value derived by the second average value deriving means for the signal having the signal value of less than or equal to a second predetermined value, multiplying the gain average value obtained by the first average value deriving means for the signal having the signal value of greater than or equal to a third predetermined value greater than the second predetermined value, and multiplying a value obtained by weighing and adding the gain average value obtained by the first average value deriving means and the gain average value obtained by the second average deriving means according to the relevant signal value for the signal having the signal value between the second predetermined value and the third predetermined value; wherein the gain deriving means derives the gain by deriving from the signals of two same filter pixels of one divided region, a predicted value of the signal of one same filter pixel of the other divided region based on the signals of a plurality of same color filter pixels near the boundary of the divided regions for each horizontal line in the gain deriving region, and comparing the derived predicted value and an actual signal value of the relevant pixel.

In the first to the fourth signal processing devices, the gain deriving means that comprises first means for selecting signals of three continuing pixels of the same color filter from a total of eight pixels, four pixels on each region near the boundary of the divided region of one horizontal line in one screen; second means for deriving, from the signal of the two pixels belonging to one divided region out of the signals of three pixels selected by the first means, the predicted value of the signal of the pixel belonging to the other divided region; third means for deriving the gain for one divided region defined in advance based on the predicted value derived by the second means and the actual signal value of the pixel; fourth means for deriving the gain by repeatedly performing the processes same as the first means, the second means, and the third means on other combinations of three continuing pixels of the same color filter in the range of eight pixels of the horizontal line; and fifth means for performing processes similar to the first means to the fourth means on all the horizontal lines in one screen is used.

In the first to the fourth signal processing devices, the devices further comprises time direction smoothing means for smoothing the gain derived for every one screen by the gain deriving means in the time direction is further provided; wherein the correcting means corrects the signal level difference between the both divided regions using the gain obtained by the time direction smoothing means.

A fifth signal processing device according to the present invention comprises an imaging element in which an imaging region is divided into a plurality of regions in the lateral direction, and an electric signal is read for each divided region; synthesis means for synthesizing the electric signal read from the imaging element to generate signals for one screen; first gain deriving means for deriving, for every group consisting of two adjacent divided regions, a gain for one divided region defined in advance of the two divided regions in the group based on the signals for one screen generated by the synthesis means; second gain deriving means for deriving, with one divided region defined in advance of all the divided regions as a reference divided region, the gain for each of the other divided regions with respect to the reference divided region based on the gain for each group derived by the first gain deriving means; and correcting means for correcting a signal level difference between a plurality of divided regions by correcting the signal of the corresponding divided region out of the signals for one screen output from the synthesis means based on the gain for each of the other divided regions with respect to the reference divided region derived by the second gain deriving means; wherein the first gain deriving means includes first means for deriving, for each group, the gain for one divided region defined in advance of the two divided regions of the group for each horizontal line in one screen based on the signals of a plurality of pixels near the boundary of two divided regions of the group out of the signals for one screen generated by the synthesis means, and second means for deriving, for each group, the gain for each group by deriving the average value of the gain for each horizontal line in one screen derived by the first means; in which the first means derives, for each group, the gain by deriving, from the signals of two same filter pixels of one divided region, a predicted value of the signal of the one same filter pixel of the other divided region based on the signals of a plurality of the same color filter pixels near the boundary of the two divided regions within the group for each horizontal line in one screen, and comparing the derived predicted value and the actual signal value of the relevant pixel.

A sixth signal processing device according to the present invention is a device wherein, in the fifth signal processing device, the first gain deriving means includes first means for deriving, for each group, a gain for one divided region defined in advance of the two divided regions in the group for each horizontal line in one screen based on the signals of a plurality of pixels near the boundary of the two divided regions in the group out of the signals for one screen generated by the synthesis means, second means for deriving, for each group, a first gain for each group by deriving an average value of the gain for each horizontal line in one screen derived by the first means, and third means for deriving, for each group, a second gain for each group by deriving an average value of the gain of the horizontal line in which a signal value of the pixel near the boundary of the two divided regions in the group is less than or equal to a first predetermined value out of the gains for each horizontal line in one screen derived by the first means; and the second gain deriving means includes means for deriving, with one divided region defined in advance of all the divided regions as the reference divided region, a third gain for each of the other divided regions with respect to the reference divided region based on the first gain for each group derived by the first gain deriving means, and means for deriving, with one divided region defined in advance of all the divided regions as the reference divided region, a fourth gain for each of the other divided regions with respect to the reference divided region based on the second gain for each group derived by the first gain deriving means; and the correcting means corrects the signal of the corresponding divided regions out of the signals for one screen output from the synthesis means based on the third gain and the fourth gain for each of the other divided regions with respect to the reference divided region derived by the second gain deriving means, where out of the signals of the divided regions to be corrected, the fourth gain corresponding to the divided region is multiplied for the signal having the signal value of less than or equal to the second predetermined value, the third gain corresponding to the divided region is multiplied for the signal having the signal value greater than or equal to the third predetermined value greater than the second predetermined value, and a value obtained by weighing and adding the third gain and the fourth gain corresponding to the divided region according to the signal value is multiplied for the signal having the signal value of between the second predetermined value and the third predetermined value.

A seventh signal processing device according to the present invention comprises an imaging element in which an imaging region is divided into a plurality of regions in the lateral direction, and an electric signal is read for each divided region; synthesis means for synthesizing the electric signal read from the imaging element to generate signals for one screen; first gain deriving means for deriving, for every group consisting of two adjacent divided regions, a gain for one divided region defined in advance of the two divided regions in the group based on a signals for one screen generated by the synthesis means; second gain deriving means for deriving, with one divided region defined in advance of all the divided regions as a reference divided region, the gain for each of the other divided regions with respect to the reference divided region based on the gain for each group derived by the first gain deriving means; and correcting means for correcting a signal level difference between a plurality of divided regions by correcting the signal of the corresponding divided region out of the signals for one screen output from the synthesis means based on the gain for each of the other divided regions with respect to the reference divided region derived by the second gain deriving means; wherein the first gain deriving means includes first means for performing, for each group, a low pass filter process in the vertical direction on the signal of each pixel of the gain deriving region near the boundary of the two divided regions in the group out of the signals for one screen generated by the synthesis means, second means for deriving, for each group, the gain for one divided region defined in advance of the two divided regions in the group for each horizontal line in the gain deriving region of the group based on the signal after filter processing of the gain deriving region of the group obtained by the first means, and third means for deriving, for each group, the gain for each group by deriving the average value of the gain for each horizontal line derived by the second means; in which the second means derives, for each group, the gain by deriving, from the signals of two same filer pixels of one divided region, the predicted value of the signal of one same filter pixel of the other region based on the signals of a plurality of same color filter pixels near the boundary of the two divided regions within the group for each horizontal line in the gain deriving region of the group, and comparing the derived predicted value and an actual signal value of the pixel.

An eighth signal processing device according to the present invention is a device wherein, in the seventh signal processing device, the first gain deriving means includes first means for performing, for each group, the low pass filter process in the vertical direction on the signal of each pixel of the gain deriving region near the boundary of the two divided regions in the group of the signals for one screen generated by the synthesis means, second means for deriving, for each group, the gain for one divided region defined in advance of the two divided regions in the group for each horizontal line in the gain deriving region of the group based on the signal after filter processing of the gain deriving region of the group obtained by the first means, third means for deriving, for each group, a first gain for each group by deriving an average value of the gain for each horizontal line derived by the second means, and fourth means for deriving, for each group, a second gain of each group by deriving an average value of the gain for the horizontal line in which the signal value of the pixel near the boundary of the two divided regions in the group is less than or equal to the first predetermined value out of the gains for each horizontal line derived by the second means; and the second gain deriving means includes means for deriving, with one divided region defined in advance of all the divided regions as the reference divided region, a third gain for each of the other divided regions with respect to the reference divided region based on the first gain for each group derived by the first gain deriving means, and means for deriving, with one divided region defined in advance of all the divided regions as the reference divided region, a fourth gain for each of the other divided regions with respect to the reference divided region based on the second gain for each group derived by the first gain deriving means; and the correcting means corrects the signal of the corresponding divided regions out of the signals for one screen output from the synthesis means based on the third gain and the fourth gain for each of the other divided regions with respect to the reference divided region derived by the second gain deriving means, where out of the signals of the divided regions to be corrected, the fourth gain corresponding to the divided region is multiplied for the signal having the signal value of less than or equal to the second predetermined value, the third gain corresponding to the divided region is multiplied for the signal having the signal value greater than or equal to the third predetermined value greater than the second predetermined value, and a value obtained by weighing and adding the third gain and the fourth gain corresponding to the divided region according to the signal value is multiplied for the signal having the signal value of between the second predetermined value and the third predetermined value.

BRIEF DESCRIPTION OF THE DRAWINGS

The invention, together with objects and advantages thereof, may best be understood by reference to the following description of the presently preferred embodiments together with the accompanying drawings in which:

FIG. 5 is a frame format view showing a table (register selecting table) showing four combinations selected by a first selector 30;

FIG. 13 is an enlarged view of a region in region e of FIG. 12;

DETAILED DESCRIPTION OF THE PREFERRED EMBODIMENTS

The embodiments of the present invention will now be described with reference to the drawings.

[1] First Embodiment

Figure 1:
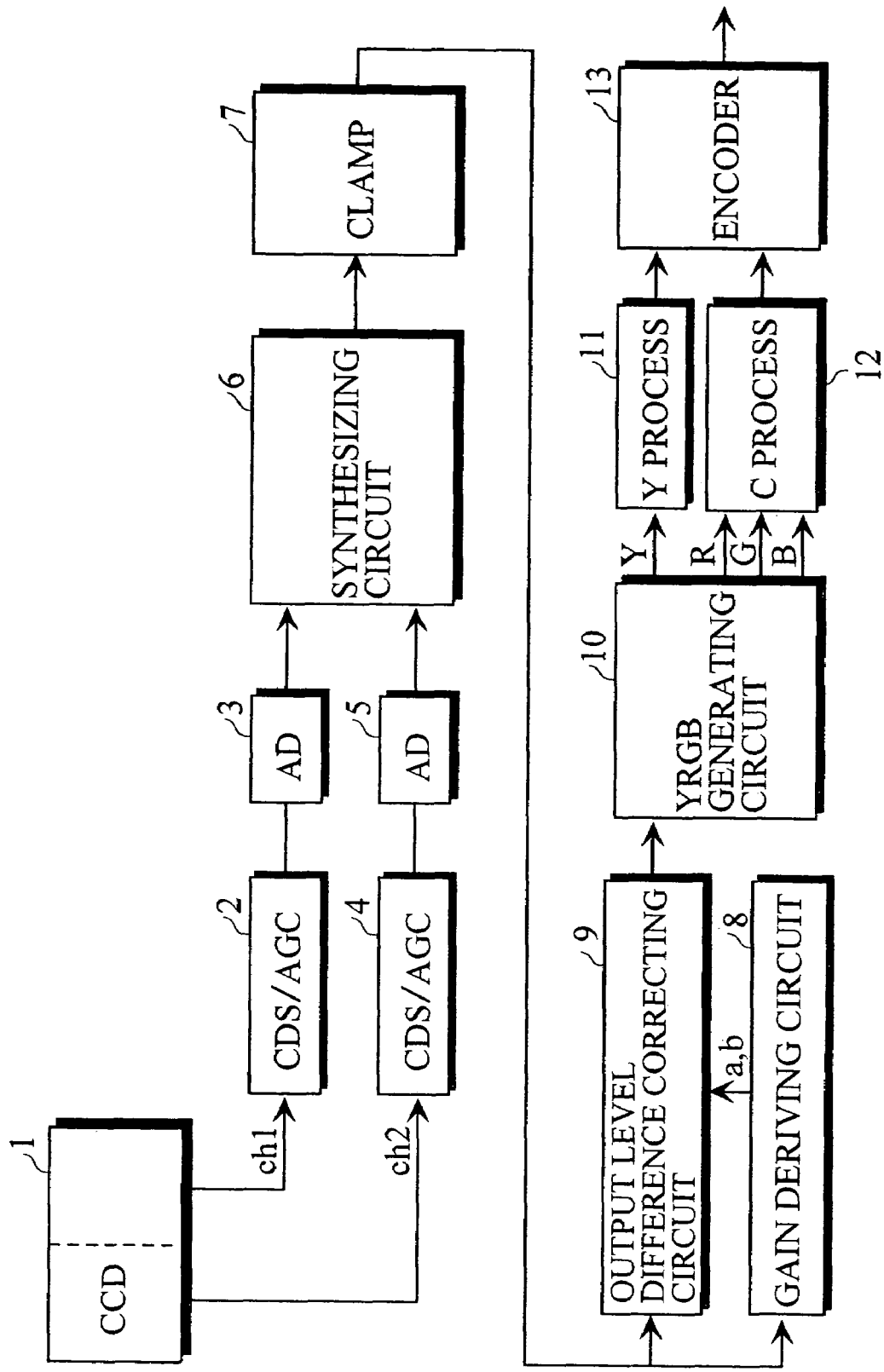
FIG. 1 is a block diagram showing one part of a configuration of a digital camera.

FIG. 1 shows one part of a configuration of a digital camera.

The CCD 1 has the imaging region thereof divided into two left and right regions (left CCD and right CCD). The signal read from one region is ch1, and the signal read from the other region is ch2. A CDS/AGC circuit and an AD conversion circuit are arranged for each channel.

The signal ch1 read from one region is sent to an image synthesizing circuit 6 by way of the CDS/AGC circuit 2 and the AD conversion circuit 3. The signal ch2 read from the other region is sent to the image synthesizing circuit 6 by way of the CDS/AGC circuit 4 and the AD conversion circuit 5.

The signals ch1, ch2 of both channels are synthesized and converted to a signal of one line in the image synthesizing circuit 6. The signal obtained by the image synthesizing circuit 6 is sent to a gain deriving circuit 8 and an output level difference correcting circuit 9 by way of a clamp circuit 7 for maintaining the black level constant.

The gain deriving circuit 8 is a circuit for deriving the gain for correcting the output signal level difference of both channels. The output level difference correcting circuit 9 is a circuit for correcting the output signal level difference of both channels based on the gain derived by the gain deriving circuit 8.

The output signal from the output level difference correcting circuit 9 is sent to an YRGB generating circuit 10. In the YRGB generating circuit 10, the Y, R, G, B signals are generated based on the output signal from the output level difference correcting circuit 9. The Y signal generated by the YRGB generating circuit 10 is sent to an encoder 13 by way of a Y process circuit 11. The R, G, B signals generated by the YRGB generating circuit 10 are sent to the encoder 13 by way of a C process circuit 12. In the encoder 13, compression of MPEG-4 method, JPEG method and the like is performed.

With the gain derived by the gain deriving circuit 8 based on the output signal of the clamp circuit 7 corresponding to an image of a certain frame and the image of the relevant frame stored in a memory, the correction may be performed on the output signal of the clamp circuit 7 corresponding to the image of the relevant frame stored in the memory using the gain for the frame. Alternatively, with the gain derived by the gain deriving circuit 8 based on the output signal of the clamp circuit 7 corresponding to the image of a certain frame, the correction may be performed on the image of a next frame using such gain.

The basic concept of correction performed by the gain deriving circuit 8 and the output level difference correcting circuit 9 will now be described with reference to FIG. 2.

Figure 2:
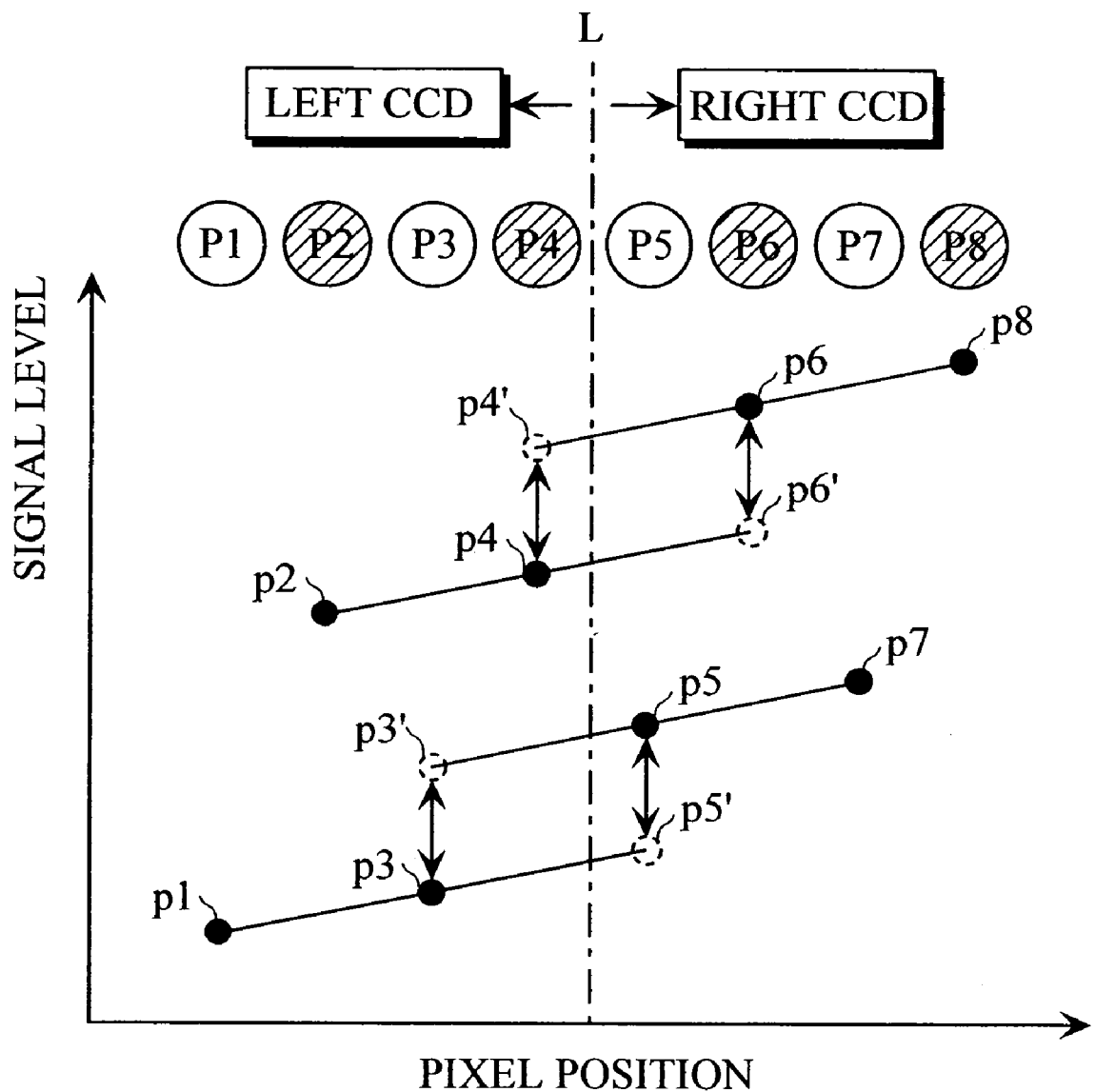
FIG. 2 is a frame format view for explaining the basic concept of the correction performed by a gain deriving circuit 8 and an output level difference correction circuit 9.

On the upper side of FIG. 2, the pixels in one horizontal line of the CCD 1 are shown, which pixels being a total of eight pixels P1 to P8, four pixels on each side of the boundary L between the left CCD and the right CCD. Further, the pixel value of each pixel P1 to P8 is represented as p1 to p8. For the sake of explanation convenience, the pixel values p1, p3, p5, p7 for a set of P1, P3, P5, P7 are shown shifted downward with respect to the pixel values p2, p4, p6, p8 for a set of P2, P4, P6, P8.

(1) Three-pixel selection is made for the continuing same color filter pixels from the eight pixels. When the color filter array is an array of Bayer array, the set of pixels P2, P4, P6, P8 are pixels of the same color filter. Further the set of pixels P1, P3, P5, P7 are pixels of the same color filter.

Therefore, the combination of the three selected pixels includes four combinations (P1, P3, P5), (P2, P4, P6), (P3, P5, P7), or (P4, P6, P8).

(2) The gain is derived for each combination.

A method of deriving the gain for the set of (P2, P4, P6) will be explained. From the pixel values p2, p4 of the two pixels P2, P4 belonging to one region (left CCD in the present example) of the three pixels, P2, P4, P6, the pixel value of one pixel P6 belonging to the other region (right CCD in the present example) is predicted. That is, in a coordinate system in which the pixel position is taken in the abscissa axis and the signal level is taken in the ordinate axis, the pixel value with respect to the pixel P6 is predicted from the slope of a line segment connecting the pixel values p2 and p4. In FIG. 2, the predicted value of pixel P6 is shown as p6'.

The gain g6 is then derived from the actual pixel value p6 of the pixel P6 and the predicted value p6'. In the present embodiment, the output signal level of the right CCD is known in advance to be higher than the output signal level of the left CCD. If the predicted value is the predicted value of the pixel within the right CCD, the gain is derived based on the actual value÷predicted value; and if the predicted value is the predicted value of the pixel within the left CCD, the gain is derived based on the predicted value÷actual value. Therefore, the gain g6 is derived from p6÷p6'.

Similarly, with regards to other combinations, (P1, P3, P5), (P3, P5, P7), and (P4, P6, P8), the predicted values p5', p3', p4' are derived and the gains g5, g3, g4 are derived.

(3) The processes of (1) and (2) are repeated in accordance with the number of horizontal lines of the image and all the obtained gains are accumulated.

(4) The average value of the gain is derived from the accumulated values of the obtained gains.

(5) The output signal level difference of both channels is corrected by multiplying the average value of the gain to the signal of each pixel of the left CCD.

Figure 3:
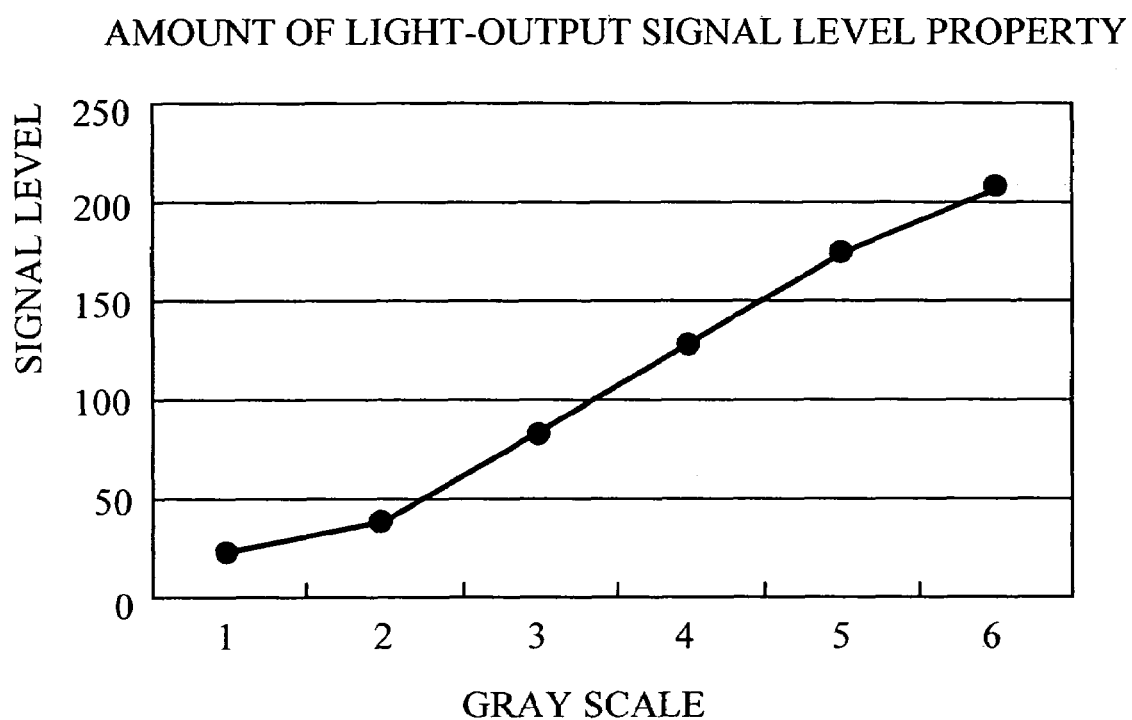
FIG. 3 is a graph showing the characteristics of amount of light-output signal level of CCD 1.

The characteristic of the amount of light—output signal level of the CCD 1 is not linear, as shown in FIG. 3. Thus, the appropriate gain differs depending on the luminance.

Therefore, in the present embodiment, in addition to the above gain (first gain), the gain (second gain) is derived with only the pixels having a luminance value of less than or equal to 5% of the dynamic range, and the multiplying gain is changed in accordance with the pixel value (luminance) of the pixel of the region (left CCD in the present example) to be corrected.

That is, for the pixel having the luminance of less than or equal to 5% of the dynamic range, correction is performed using the second gain. For the pixel having the luminance of 5% to 10% of the dynamic range, correction is performed using the weighted and added gain of the first gain and the second gain. For the pixel having the luminance of greater than or equal to 10% of the dynamic range, correction is performed using the first gain.

Figure 4:
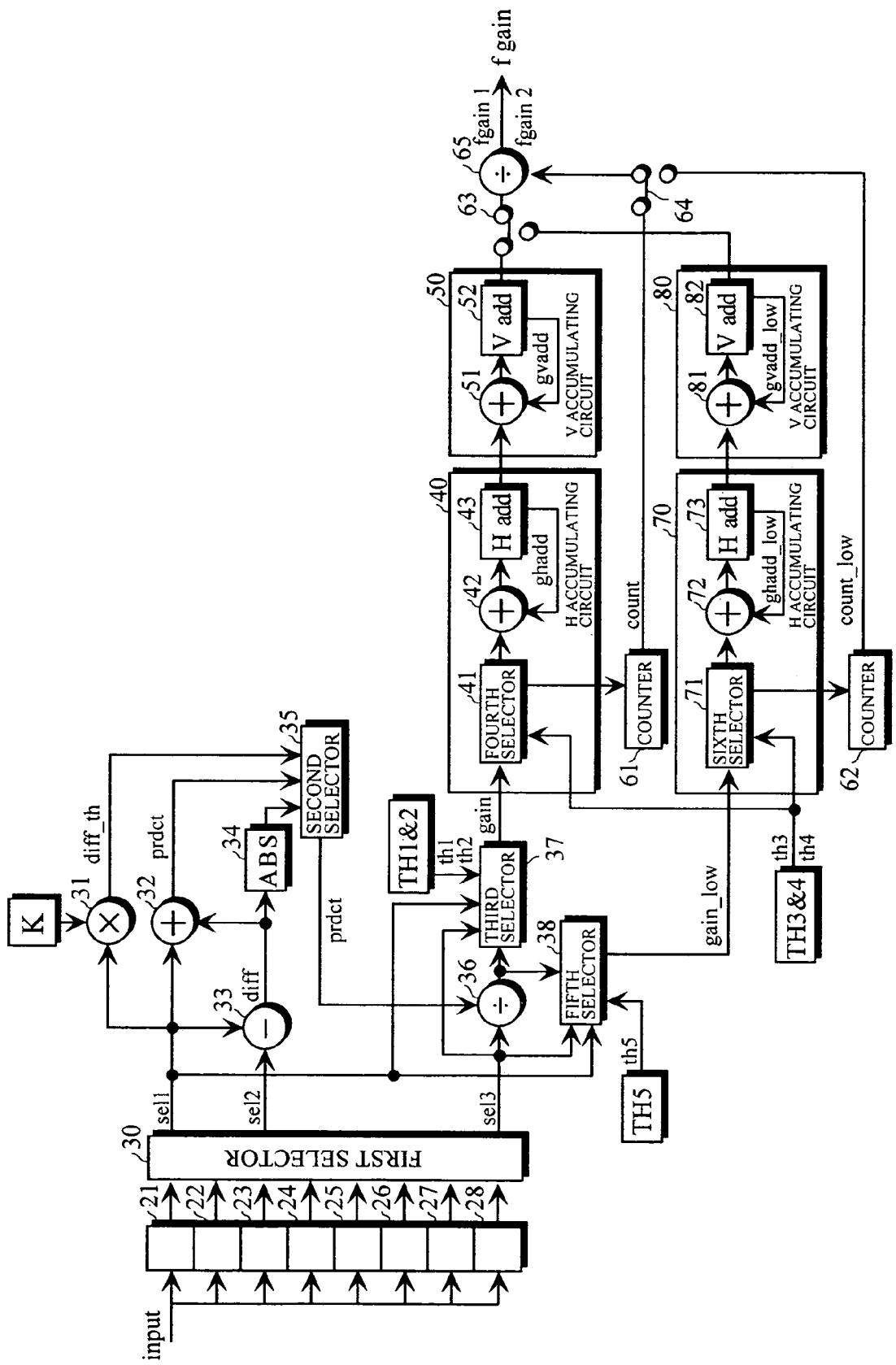
FIG. 4 is a block diagram showing a configuration of the gain deriving circuit 8.
Figure 6:
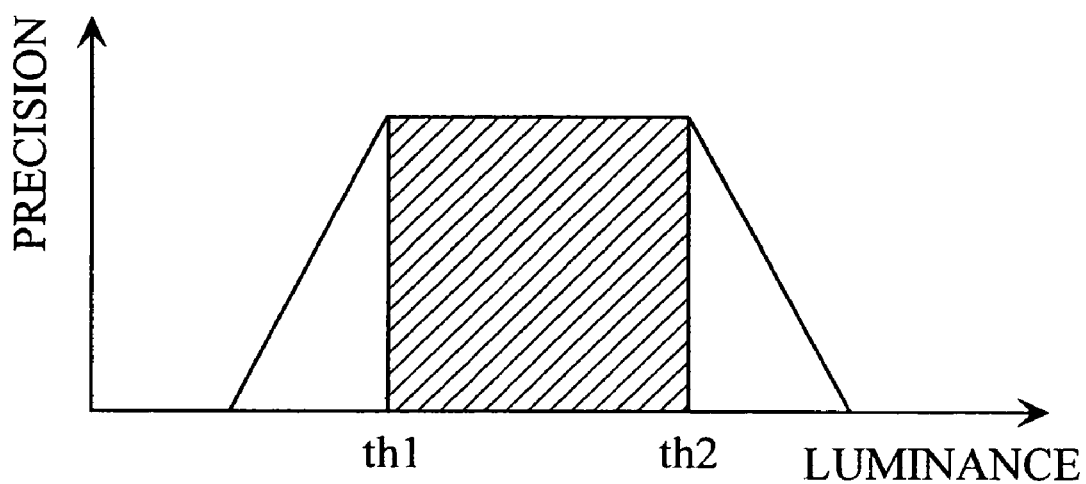
FIG. 6 is a graph for explaining the operation of a third selector 37.

FIG. 4 shows a configuration of the gain deriving circuit 8.

The first to eighth registers 21 to 28 are registers for holding the pixel values reg1 to reg8 for the pixels within one horizontal line of the CCD 1, the pixels being a total of eight pixels, four pixels on each side of the boundary L between the left CCD and the right CCD.

The pixel values reg1 to reg8 held in each register 21 to 28 are sent to a first selector 30. The first selector 30 selects the pixel values of the three continuing pixels of the same color filter from the pixel values reg1 to reg8 of the eight pixels held in each register 21 to 28 and outputs the selected pixel values as sel1, sel2, and sel3.

As noted above, the combination of the three selected pixels includes four combinations of (P1, P3, P5), (P2, P4, P6), (P3, P5, P7), and (P4, P6, P8), as shown in FIG. 2. The first selector 30 selects and outputs the four combinations in sequential order.

FIG. 5 shows a table (register selection table) representing the four combinations selected by the first selector 30.

A case of when reg4 (pixel value p4 of the pixel corresponding to P4 of FIG. 2) is selected as sel1, reg2 (pixel value p2 of the pixel corresponding to P2 of FIG. 2) is selected as sel2, and reg6 (pixel value p6 of the pixel corresponding to P6 of FIG. 2) is selected as sel3 will be explained by way of an example.

The sel1 (=p4) is sent to a multiplier 31, an adder 32, a subtracter 33, a third selector 37, and a fifth selector 38. The sel2 (=p2) is sent to the subtracter 33. The sel3 (=p6) is sent to the third selector 37, a divider 36, and the fifth selector 38.

In the subtracter 33, calculation of sel1−sel2 (=p4−p2) is performed. The calculation result diff (=sel1−sel2) of the subtracter 33 is sent to an absolute value circuit (ABS) 34 and also sent to the adder 32.

In the absolute value circuit 34, the absolute value (|diff|=|sel1−sel2|) of the calculation result diff of the subtracter 33 is obtained, and the obtained absolute value is sent to a second selector 35. In the adder 32, calculation of sel1+diff (=p4+diff) is performed to derive the predicted value (p6′) of the pixel (P6) corresponding to sel3, and the calculation result prdct (=P6′) is sent to the second selector 35. In the multiplier 31, a coefficient K is multiplied to sel1, and the multiplication result diff_th (=K*sel1=K*p4) is sent to the second selector 35. K is set to a value within a range of ½ to 1/64.

The second selector 35 determines whether the absolute value |diff|=|sel1−sel2|) from the absolute value circuit 34 is greater (|diff|>diff_th) than the multiplication result diff_th (=K*sel1) from the multiplier 31. That is, determination is made whether the absolute value of the difference between sel1 (=p4) and sel2 (=p2) is greater than diff_th. If |diff|>diff_th, the predicted value is determined to have low reliability, and the predicted value prdct is excluded. That is, the predicted value prdct obtained this time is not used to derive the first gain. If |diff|≦diff_th, the predicted value prdct obtained this time is provided to the divider 36. In the second selector 35, determination is made whether the absolute value |diff| is greater than K*sel1, but determination may also be made whether the absolute value |diff| is greater than a predetermined threshold value (threshold value set in advance).

In the divider 36, the calculation of sel3÷prdct (=p6÷p6′) is performed to derive the gain, and the calculation result is sent to the third selector 37 and the fifth selector 38. The threshold values th1 and th2 (th2>th1) are provided to the third selector 37. The deriving precision of the gain is considered to be high in a range of greater than or equal to the threshold value th1 and smaller than or equal to threshold value th2. That is, the precision of the derived gain is considered to be low in low luminance part and in high luminance part. The third selector 37 determines whether a condition that both the sel1 (=p4) and sel3 (=p6) are within a range of greater than or equal to the threshold value th1 and smaller than or equal to the threshold value th2 is met. When the condition is not met, the division result sel3/prdct of the divider 36 is excluded. When the condition is met, the division result sel3/prdct of the divider 36 is output as the gain.

Figure 7:
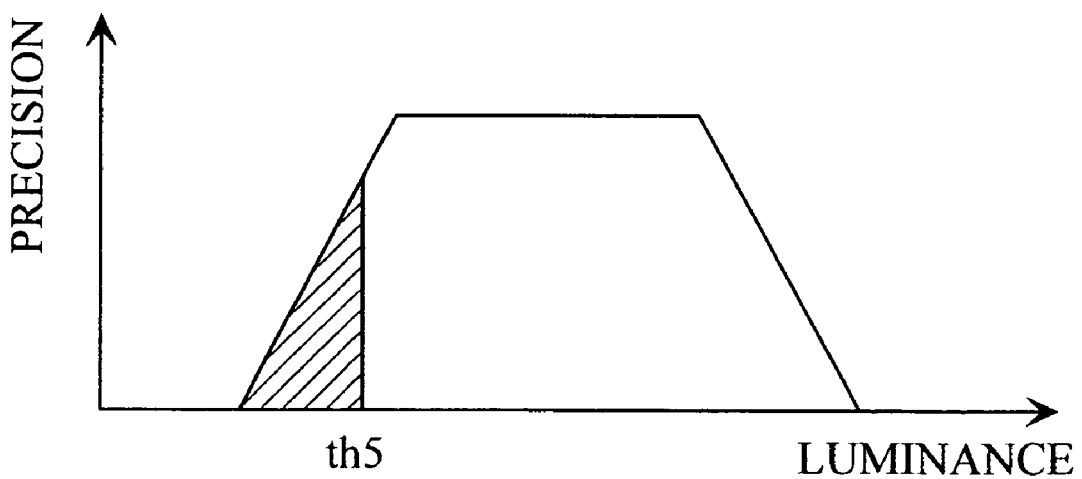
FIG. 7 is a graph for explaining the operation of a fifth selector 38.

The threshold value th5 is provided to the fifth selector 38. The fifth selector 38 extracts only the gain derived at the low luminance part of smaller than or equal to threshold value th5, as shown in FIG. 7, to derive the second gain. The fifth selector 38 determines whether a condition that both the sel1 (=p4) and the sel3 (=p6) are smaller than or equal to threshold value th5 is met. When the condition is not met, the division result sel3/prdct of the divider 36 is excluded. When the condition is met, the division result sel3/prdct of the divider 36 is output as gain_low.

The gain output from the third selector 37 is sent to an H accumulating circuit 40. The H accumulating circuit 40 is a circuit for accumulating the gain output from the third selector 37 for one horizontal period, and is equipped with a fourth selector 41, an adder 42, and a register (Hadd) 43.

The threshold values th3 and th4 are provided to the fourth selector 41. The fourth selector 41 is for excluding the gain outside a predetermined range. More specifically, the fourth selector 41 selects and outputs only the gain within a range of (th3−th4)≦gain≦(th3+th4), and excludes the gain outside the range. When determined that the input gain is within a range of (th3−th4)≦gain≦(th3+th4), the fourth selector 41 outputs a clock pulse to a counter 61. The counter 61 counts the clock pulse from the fourth selector 41.

The gain output from the fourth selector 41 is input to the adder 42. The gain accumulated value ghadd held in the register (Hadd) 43 is also input to the adder 42. The adder 42 adds the gain from the fourth selector 41 to the gain accumulated value ghadd from the register (Hadd) 43. The addition result of the adder 42 is stored in the register (Hadd) 43. Thus, when the accumulated value of the gain for one horizontal line is stored in the register 43, the accumulated value of the gain for one horizontal line stored in the register 43 is provided from the register 43 to the V accumulated circuit 50, and the content of the register 43 is cleared.

The V accumulated circuit 50 is a circuit for deriving the gain accumulated value for every one vertical period, and is equipped with an adder 51 and a register (Vadd) 52. The gain accumulated value derived for every one horizontal period from the H accumulating circuit 40 is input to the adder 51. The gain accumulated value gvadd held in the register (Vadd) 52 is also input to the adder 51. The adder 51 adds the gain accumulated value from the H accumulating circuit 40 to the gain accumulated value gvadd from the register (Vadd) 52. The addition result of the adder 51 is stored in the register (Vadd) 52. Thus, when the accumulated value of the gain for one vertical period is stored in the register 52, the gain accumulated value for one vertical period stored in the register 52 is provided from the register 52 to the divider 65 by way of a switch 63, and the content of the register 52 is cleared. Here, a count value count of the counter 61 is provided to the divider 65 by way of a switch 64. The divider 65 performs the calculation of gain accumulated value for one vertical period÷count to derive the first gain fgain1.

The gain_low output from the fifth selector 38 is sent to the H accumulating circuit 70. The H accumulating circuit 70 is a circuit for accumulating the gain output from the fifth selector 38 for one horizontal period, and is equipped with a sixth selector 71, an adder 72 and a register (Hadd) 73.

The sixth selector 71 performs a process similar to the fourth selector 41. That is, the sixth selector 71 selects and outputs only the gain low within a range of (TH3−TH4)≦ gain_low≦(TH3+TH4), and excludes the gain_low outside the range. When determined that the input gain_low is within the range of (TH3−TH4)≦gain_low≦(TH3+TH4), the sixth selector 71 outputs a clock pulse to a counter 62. The counter 62 counts the clock pulse from the sixth selector 71.

The gain_low output from the sixth selector 71 is input to the adder 72. The gain accumulated value ghadd_low held in the register (Hadd) 73 is also input to the adder 72. The adder 72 adds the gain_low from the sixth selector 71 to the gain accumulated value ghadd_low from the register (Hadd) 73. The addition result of the adder 72 is stored in the register (Hadd) 73. Thus, when the accumulated value of the gain for one horizontal line is stored in the register 73, the accumulated value of the gain for one horizontal line stored in the register 73 is provided from the register 73 to the V accumulating circuit 80, and the content of the register 73 is cleared.

The V accumulating circuit 80 is a circuit for deriving the gain accumulating value for every one vertical period, and is equipped with an adder 81 and a register (Vadd) 82. The gain accumulated value derived for every one horizontal period from the H accumulating circuit 70 is also input to the adder 81. The gain accumulated value gvadd_low held in the register (Vadd) 82 is also input to the adder 81. The adder 81 adds the gain accumulated value from the H accumulating circuit 70 to the gain accumulated value gvadd_low from the register (Vadd) 82. The addition result of the adder 81 is stored in the register (Vadd) 82. Thus, when the accumulated value of the gain for one vertical period is stored in the register 82, the gain accumulated value for one vertical period stored in the register 82 is provided from the register 82 to the divider 65 by way of the switch 63, and the content of the register 82 is cleared. Here, the count value count_low of the counter 62 is provided to the divider 65 by way of the switch 64. The divider 65 performs calculation of gain accumulated value for one vertical period÷count_low to derive the second gain fgain 2.

Figure 8:
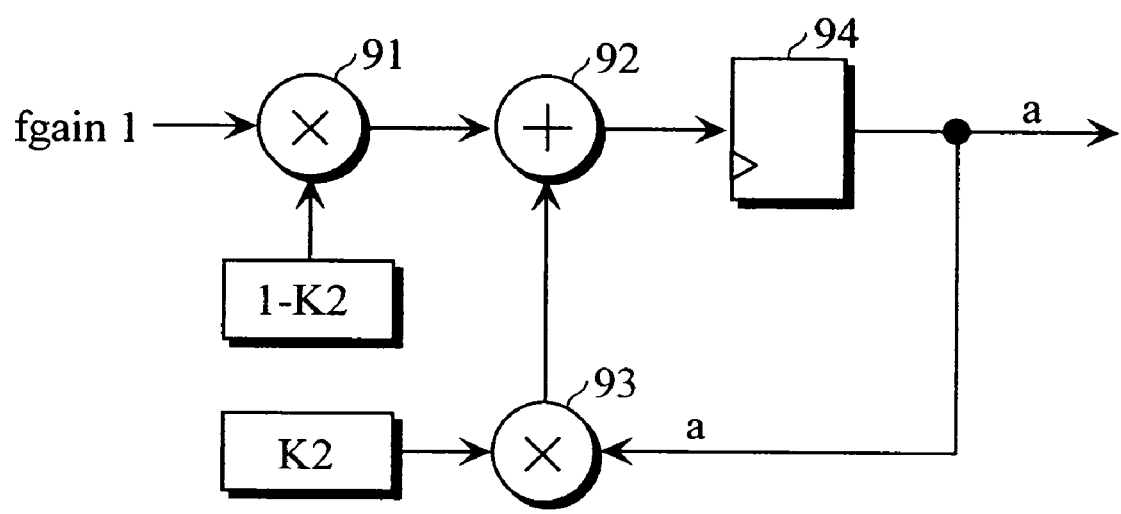
FIG. 8 is a circuit diagram showing one example of a filter circuit.

The first gain fgain1 and the second gain fgain2 are derived for every one frame, as noted above, but a circuit for performing filtering in a time direction is preferably arranged in the gain deriving circuit 8 to prevent sudden change of gain between frames. One example of a filter circuit for performing filtering is shown in FIG. 8.

Here, the first gain fgain1 will be explained by way of example. The gain output from the filter circuit is represented by a.

The first gain fgain1 is input to a first multiplier 91. A coefficient (1−K2) is provided to the first multiplier 91. K2 is set to a value within a range of for example, ½ to 1/64. In the first multiplier 91, the calculation of (1−K)*fgain1 is performed. The calculation result of the multiplier 91 is sent to the adder 92.

On the other hand, the coefficient K2 is provided to a second multiplier 93. Further, the output a of the filter circuit of the previous frame is provided from the register 94 to the second multiplier 93. The calculation of K2*a is performed in the second multiplier 93. The multiplication result of the second multiplier 93 is sent to the adder 92. The calculation of (1−K)*fgain1+K2*a is performed in the adder 92. The calculation result of the adder 92 is stored in the register 94, and output as the first gain a calculated this time. The output of the filter circuit of the second gain fgain2 is represented by b.

The output level difference correcting circuit 9 corrects the signal level of the pixel corresponding to the left CCD of the signals for one channel that has been input based on the first gain a and the second gain b obtained by the gain deriving circuit 8.

Figure 9:
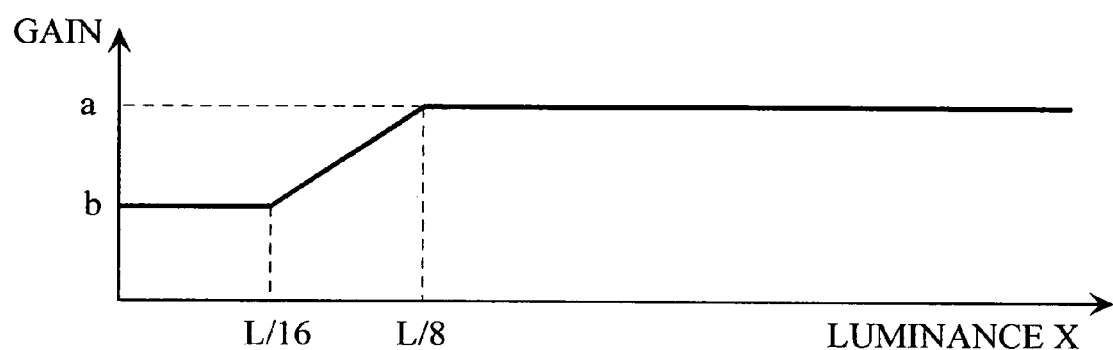
FIG. 9 is a graph showing the gain with respect to the signal level.

The signal level corresponding to the maximum value of the luminance is assumed as L. In this example, L=$2^n$ (n=12). The gain with respect to the signal level is as shown in FIG. 9. That is, the gain $g_L$ with respect to the pixel having a signal level of less than or equal to L/16 becomes the second gain b. Further, the gain $g_H$ with respect to the pixel having a signal level of greater than or equal to L/8 becomes the first gain a. The gain $g_M$ with respect to the pixel having a signal level within a range of L/16 to L/8 is derived by the following equation (1) with the signal level as X.

$$g_M = b + (a-b) \times [\{X - (L/16)\} \div (L/16)] \tag{1}$$

The output level difference correcting circuit 9 multiplies, to the signal of each pixel corresponding to the left CCD, the gain ($g_L$, $g_H$, or $g_M$) corresponding to the signal level thereof. The output signal level difference of both channels is thereby corrected.

[2] Second Embodiment

The correction gain is derived in the following manner in the above first embodiment.

(1) As shown in FIG. 2, the continuing same color filter pixels are three-pixel selected from a total of eight pixels P1 to P8, four pixels on each side of the boundary L of the left CCD and the right CCD, the pixels being within one horizontal line of the CCD 1. If the color filter array is an array of Bayer array, the combination of the three selected pixels includes four combinations of (P1, P3, P5), (P2, P4, P6), (P3, P5, P7), and (P4, P6, P8).

(2) From the pixel values of two pixels on one CCD side of either the left CCD or the right CCD, the pixel value of one pixel on the other CCD side is predicted for each combination (P1, P3, P5), (P2, P4, P6), (P3, P5, P7), and (P4, P6, P8), and the predicted value and the luminance ratio (gain g5, g6, g3, g4) between the predicted value and the actual value with respect to the one pixel on the other CCD side are derived.

(3) The processes of (1) and (2) are repeated in accordance with the number of horizontal lines of the image.

(4) The correction gain for correcting the signal of one CCD out of the left CCD and the right CCD is calculated from the distribution of all obtained luminance ratio (gain).

Figure 10:
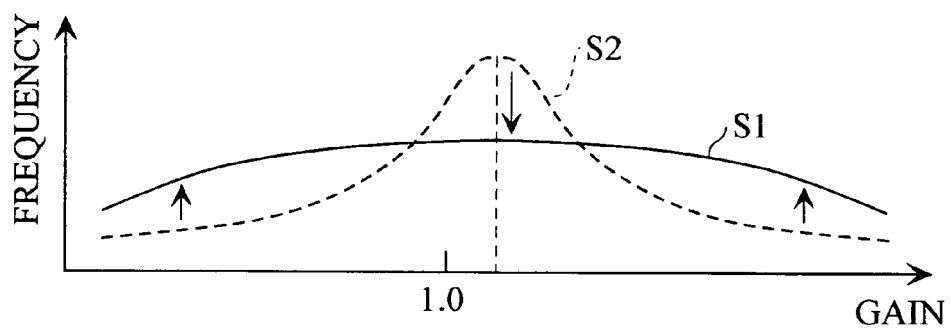
FIG. 10 is a graph showing how the distribution of all luminance ratio (gain) becomes broad (flat) when the S/N ratio of the image is not satisfactory, and how the distribution of the luminance ratio (gain) has peaks when the influence of the noise during gain deriving is reduced.

If the S/N ratio of the image is not satisfactory, distribution of all the luminance ratio (gain) obtained in (3) becomes broad (flat), as shown with a curve S1 in FIG. 10, and thus the detection of the peak of the distribution becomes difficult. Thus, an accurate correction gain cannot be derived.

Figure 11:
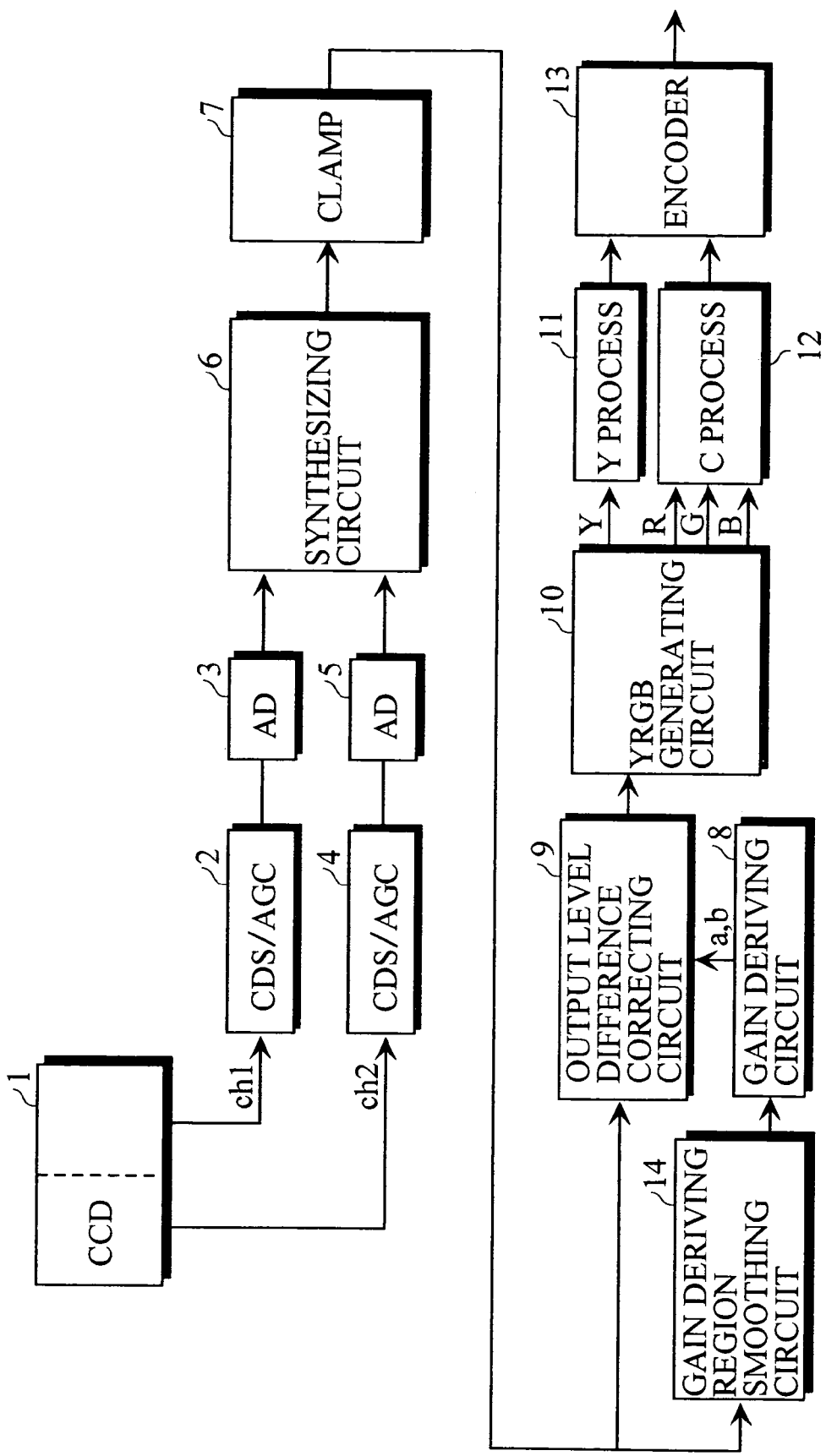
FIG. 11 is a block diagram showing one part of a configuration of the digital camera.

In embodiment 2, as shown in FIG. 11, a gain deriving region smoothing circuit 14 is arranged in the previous stage of the gain deriving circuit 8 to reduce the noise within the gain deriving region. The gain is then derived using the signal of each pixel within the gain deriving region after noise reduction. As shown with a broken line S2 in FIG. 10, the distribution of all the luminance ratios (gain) obtained in (3) thus has peaks, and an appropriate correction gain can be derived. In FIG. 11, the same reference characters are denoted for the components same as in FIG. 1, and the explanation thereof is omitted.

Figure 12:
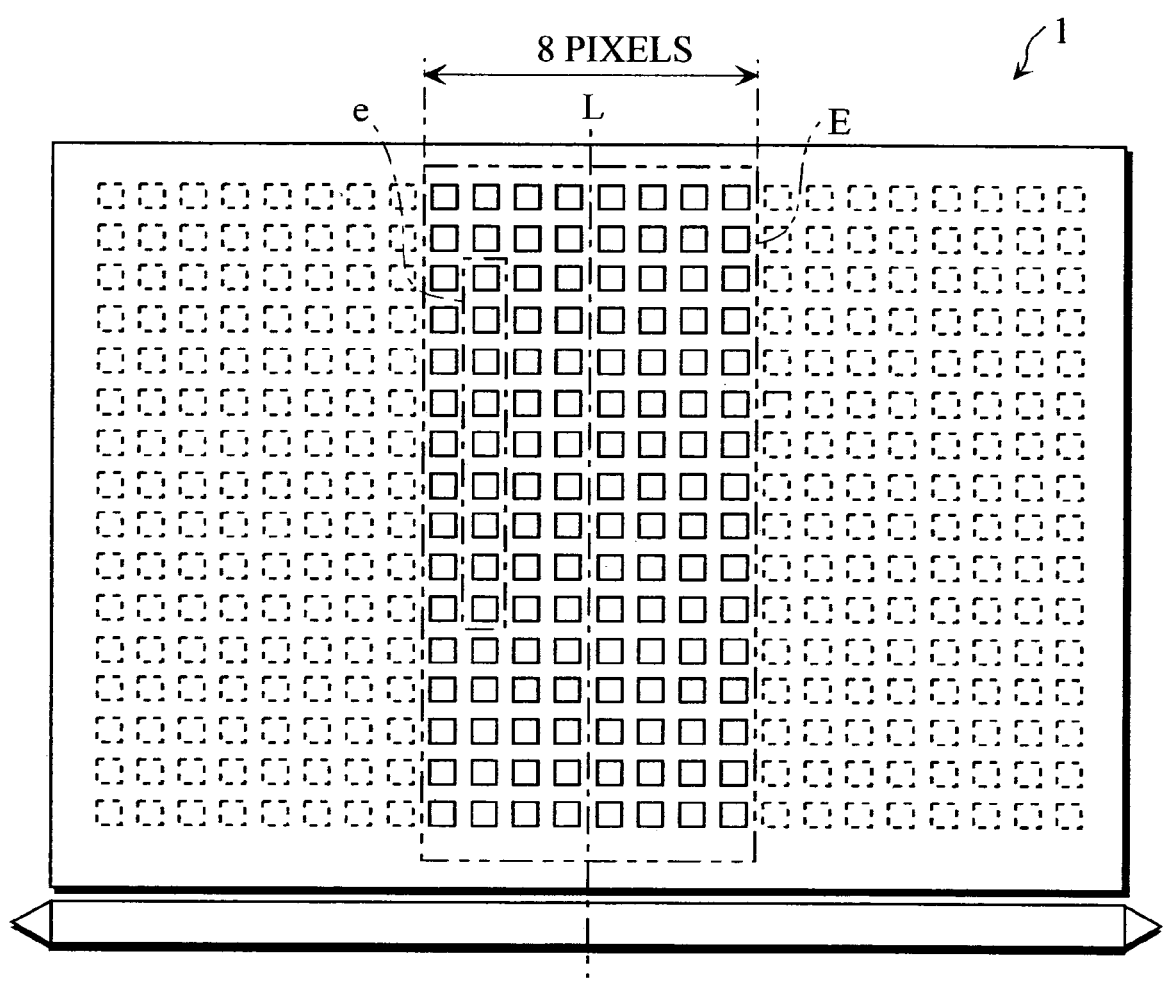
FIG. 12 is a frame format view showing a region (gain deriving region) E to where a vertical LPF process is performed by a gain deriving region smoothing circuit 14.

A VLPF circuit for performing vertical LPF process is used for the gain deriving region smoothing circuit 14. The region (gain deriving region) E performed with the vertical LPF process by the gain deriving region smoothing circuit 14 is, as shown in FIG. 12, a region including eight pixels with the boundary L between the left CCD and the right CCD of each horizontal line of the CCD 1 as the center. The vertical LPF process is performed on each pixel of the gain deriving region.

For instance, the vertical LPF process of when the pixel at the center of nine pixels lined in the vertical direction within region e of FIG. 12 is the focusing pixel will be explained.

FIG. 13 is an enlarged view of the region of region e of FIG. 12. The nine pixels lined in the vertical direction of region e are denoted as $A_0, A_1, A_2, \ldots, A_7, A_8$ from the lower side. The focusing pixel is $A_4$. The pixel values of $A_0$ to $A_8$ are $S_0$ to $S_8$. The pixel value $S_4$ after vertical LPF process of the focusing pixel $A_4$ is expressed by, for example, the following equation (2). $V_{Km}(m=0, 1, \ldots, 8)$ is a value within the range of 0 to 7.

$$S'_4 = \frac{V_{K0} \cdot S_0 + V_{K1} \cdot S_1 + \ldots + V_{K7} \cdot S_7 + V_{K8} \cdot S_8}{V_{K0} + V_{K1} + \ldots + V_{K7} + V_{K8}} \quad (2)$$

Figure 14:
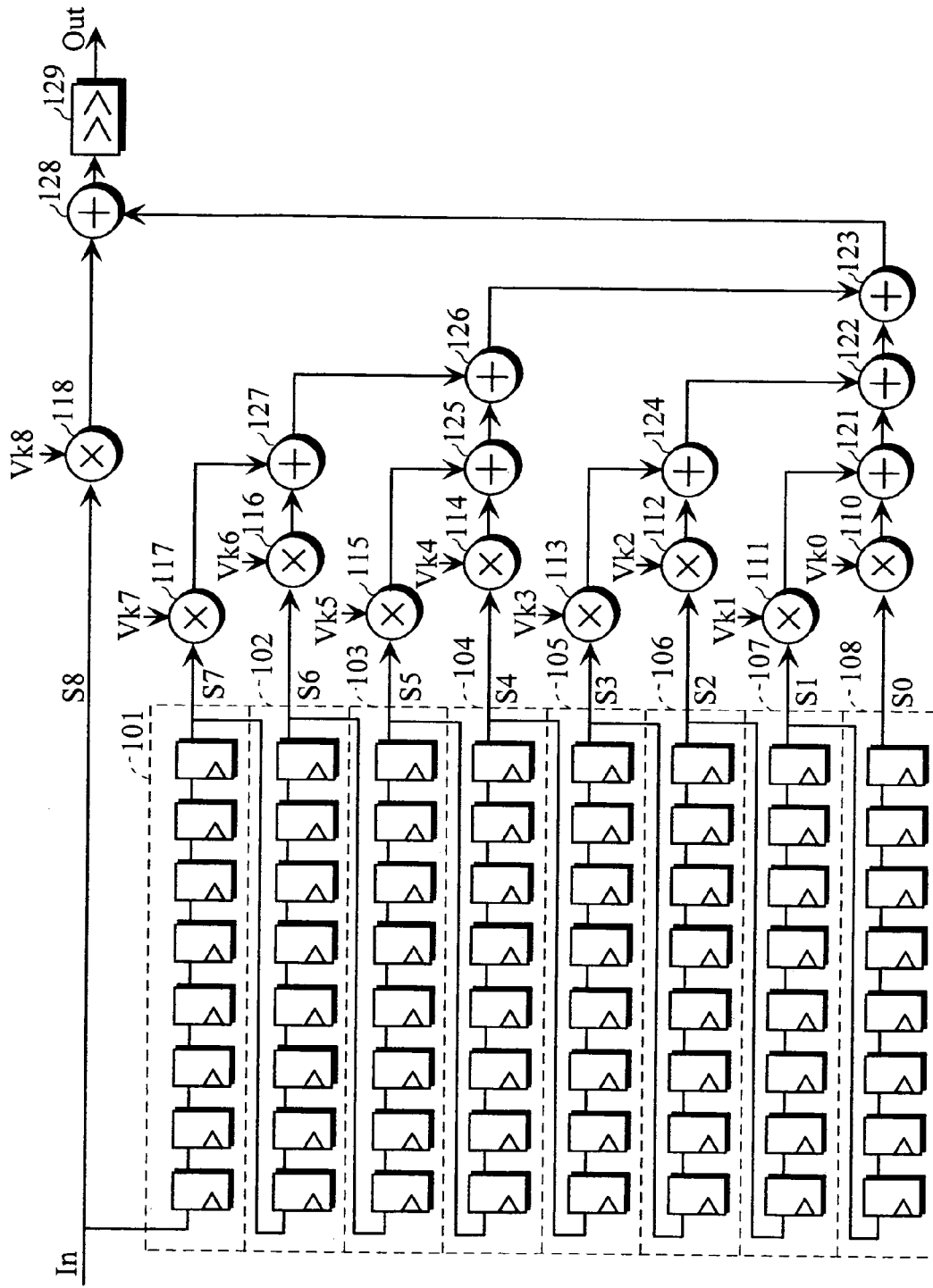
FIG. 14 is a circuit diagram showing a configuration example of the gain deriving region smoothing circuit 14.

FIG. 14 shows a configuration example of the gain deriving region smoothing circuit 14.

101 to 108 are line memories of the first stage to the eighth stage each capable of storing data worth of eight pixels. Each line memory 101 to 108 is configured from eight flip-flops (FF) connected in series. Data worth of one pixel is stored in each FF. The FF on the rear end in the line memory of the $n^{th}$ stage (n=1, 2, ..., 7) is connected in series with the FF of the front end in the line memory of the $n+1^{th}$ stage. It is to be noted that only the data of the pixels within the gain deriving region is stored in these line memories. In the gain deriving region smoothing circuit 14, the vertical LPF output with respect to the pixel (focusing pixel) corresponding to the data output from the FF of the rear end in the line memory 104 of the fourth stage is obtained as signal Out.

The output signal In of the clamp circuit 7 is input to the multiplier 118 and also input to the FF of the front end in the line memory 101 of the first stage. In the multiplier 118, the coefficient $V_{K8}$ is multiplied to the signal In ($=S_8$). The output signal $V_{K8} \cdot S_8$ of the multiplier 118 is sent to the adder 128.

The output signal $S_7$ of the FF of the rear end in the line memory 101 of the first stage is sent to the multiplier 117 and multiplied by $V_{K7}$. The output signal $V_{K7} \cdot S_7$ of the multiplier 117 is sent to the adder 127. The output signal $S_6$ of the FF of the rear end in the line memory 102 of the second stage is sent to the multiplier 116 and multiplied by $V_{K6}$. The output signal $V_{K6} \cdot S_6$ of the multiplier 116 is sent to the adder 127. The output signal $V_{K7} \cdot S_7$ of the multiplier 117 and the output signal $V_{K6} \cdot S_6$ of the multiplier 116 are added in the adder 127. The output signal $(V_{K6} \cdot S_6 + V_{K7} \cdot S_7)$ of the adder 127 is sent to the adder 126.

The output signal $S_5$ of the FF of the rear end in the line memory 103 of the third stage is sent to the multiplier 115 and multiplied by $V_{K5}$. The output signal $V_{K5} \cdot S_5$ of the multiplier 115 is sent to the adder 125. The output signal $S_4$ of the FF of the rear end in the line memory 104 of the fourth stage is sent to the multiplier 114 and multiplied by $V_{K4}$. The output signal $V_{K4} \cdot S_4$ of the multiplier 114 is sent to the adder 125. The output signal $V_{K5} \cdot S_5$ of the multiplier 115 and the output signal $V_{K4} \cdot S_4$ of the multiplier 114 are added in the adder 125. The output signal $(V_{K4} \cdot S_4 + V_{K5} \cdot S_5)$ of the adder 125 is sent to the adder 126. The output signal $(V_{K6} \cdot S_6 + V_{K7} \cdot S_7)$ of the adder 127 and the output signal $(V_{K4} \cdot S_4 + V_{K5} \cdot S_5)$ of the adder 125 are added in the adder 126.

The output signal $S_3$ of the FF of the rear end in the line memory 105 of the fifth stage is sent to the multiplier 113 and multiplied by $V_{K3}$. The output signal $V_{K3} \cdot S_3$ of the multiplier 113 is sent to the adder 124. The output signal $S_2$ of the FF of the rear end in the line memory 106 of the sixth stage is sent to the multiplier 112 and multiplied by $V_{K2}$. The output signal $V_{K2} \cdot S_2$ of the multiplier 112 is sent to the adder 124. The output signal $V_{K3} \cdot S_3$ of the multiplier 113 and the output signal $V_{K2} \cdot S_2$ of the multiplier 112 are added in the adder 124. The output signal $(V_{K2} \cdot S_2 + V_{K3} \cdot S_3)$ of the adder 124 is sent to the adder 122.

The output signal $S_1$ of the FF of the rear end in the line memory 107 of the seventh stage is sent to the multiplier 111 and multiplied by $V_{K1}$. The output signal $V_{K1} \cdot S_1$ of the multiplier 111 is sent to the adder 121. The output signal $S_0$ of the FF of the rear end in the line memory 108 of the eighth stage is sent to the multiplier 110 and multiplied by $V_{K0}$. The output signal $V_{K0} \cdot S_0$ of the multiplier 110 is sent to the adder 121. The output signal $V_{K1} \cdot S_1$ of the multiplier 111 and the output signal $V_{K0} \cdot S_0$ of the multiplier 110 are added in the adder 121. The output signal $(V_{K0} \cdot S_0 + V_{K1} \cdot S_1)$ of the adder 121 is sent to the adder 122. The output signal $(V_{K0} \cdot S_0 + V_{K1} \cdot S_1)$ of the adder 121 and the output signal $(V_{K2} \cdot S_2 + V_{K3} \cdot S_3)$ of the adder 124 are added in the adder 122.

The output signal $(V_{K0} \cdot S_0 + V_{K1} \cdot S_1 + V_{K2} \cdot S_2 + V_{K3} \cdot S_3)$ of the adder 122 is sent to the adder 123. The output signal $(V_{K0} \cdot S_0 + V_{K1} \cdot S_1 + V_{K2} \cdot S_2 + V_{K3} \cdot S_3)$ of the adder 122 and the output signal $(V_{K4} \cdot S_4 + V_{K5} \cdot S_5 + V_{K6} \cdot S_6 + V_{K7} \cdot S_7)$ of the adder 126 are added in the adder 123.

The output signal $(V_{K0} \cdot S_0 + V_{K1} \cdot S_1 + V_{K2} \cdot S_2 + V_{K3} \cdot S_3 + V_{K4} \cdot S_4 + V_{K5} \cdot S_5 + V_{K6} \cdot S_6 + V_{K7} \cdot S_7)$ of the adder 123 is sent to the adder 128. The output signal $(V_{K0} \cdot S_0 + V_{K1} \cdot S_1 + V_{K2} \cdot S_2 + V_{K3} \cdot S_3 + V_{K4} \cdot S_4 + V_{K5} \cdot S_5 + V_{K6} \cdot S_6 + V_{K7} \cdot S_7)$ of the adder 123 and the output signal $V_{K8} \cdot S_8$ of the multiplier 118 are added in the adder 128.

The output signal $(V_{K0} \cdot S_0 + V_{K1} \cdot S_1 + V_{K2} \cdot S_2 + V_{K3} \cdot S_3 + V_{K4} \cdot S_4 + V_{K5} \cdot S_5 + V_{K6} \cdot S_6 + V_{K7} \cdot S_7 + V_{K8} \cdot S_8)$ of the adder 128 is sent to a shift circuit 129.

The output signal of the adder 128 is shifted in the right direction by the number of bits (0 to 4) set in advance in accordance with the set value of the coefficient $V_{Km}$ (=0, 1, ..., 8). If the number of bits set in advance is 0, the output signal of the adder 128 is divided by 1, if the number of bits set in advance is 1, the output signal of the adder 128 is divided by 2, if the number of bits set in advance is 3, the output signal of the adder 128 is divided by 8, and if the number of bits set in advance is 4, the output signal of the adder 128 is divided by 16.

[3] Third Embodiment

In the first embodiment and the second embodiment, the imaging region of the CCD is divided into two left and right regions, and the data are simultaneously read for each divided region, but the present invention is also applicable even if the imaging region of the CCD is divided into three or more regions in the left and right direction and the data are simultaneously read for each divided region.

Figure 15:
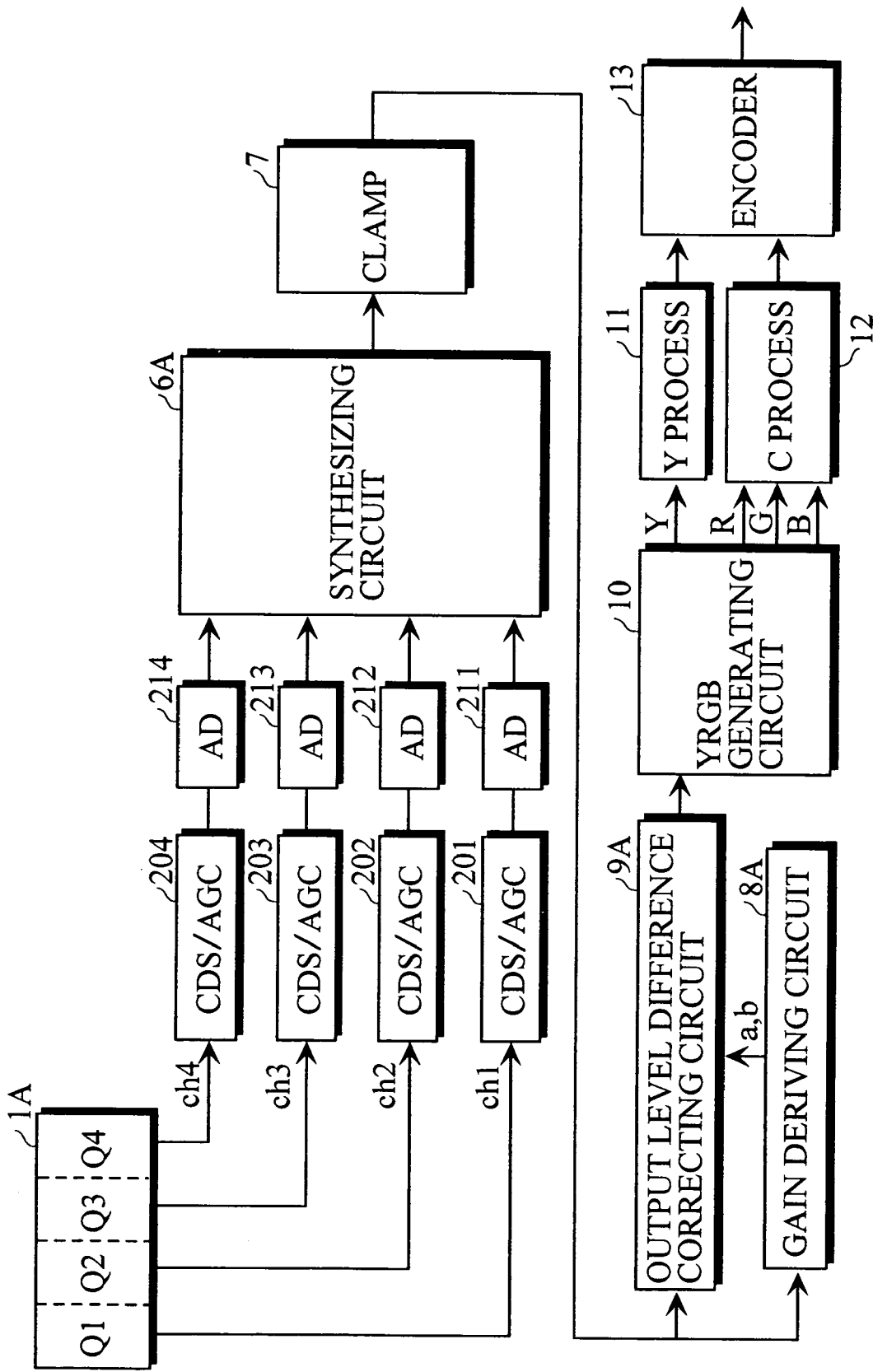
FIG. 15 is a block diagram showing one part of the configuration of the digital camera.

A method of correcting, in a case of when the imaging region of the CCD 1A is divided into four regions and the data ch1 to ch4 are simultaneously read for each divided region Q1 to Q4, as shown in FIG. 15, the output level difference of each divided region Q1 to Q4 will now be described.

The CCD 1A has the imaging region thereof divided into four regions Q1 to Q4 in the left and right direction. The signal read from each region Q1 to Q4 is ch1 to ch4. The CDS/AGC circuit and the AD conversion circuit are arranged for each channel.

The signals ch1 to ch4 read from each region Q1 to Q4 are sent to the image synthesizing circuit 6A by way of the CDS/AGC circuits 201 to 204 and the AD conversion circuits 211 to 214.

The signals ch1 to ch4 of each channel are synthesized and converted to a signal of one line in the image synthesizing circuit 6A. The signal obtained by the image synthesizing circuit 6A is sent to the gain deriving circuit 8A and the output level difference correcting circuit 9A by way of the clamp circuit 7 for maintaining the black level constant.

The gain deriving circuit 8A is a circuit for deriving the gain for correcting the output signal level difference of each channel. The output level difference correcting circuit 9A is a circuit for correcting the output signal level difference of each channel based on the gain derived by the gain deriving circuit 8A.

The output signal from the output level difference correcting circuit 9A is sent to the YRGB generating circuit 10. The Y, R, G, B signals are generated in the YRGB generating circuit 10 based on the output signal from the output level difference correcting circuit 9A. The Y signal generated by the YRGB generating circuit 10 is sent to the encoder 13 by way of the Y process circuit 11. The R, G, B signals generated by the YRGB generating circuit 10 are sent to the encoder 13 by way of the C process circuit 12. In the encoder 13, compression of MPEG-4 method, JPEG method and the like is performed.

The operations of the gain deriving circuit 8A and the output level difference correcting circuit 9A will now be explained. The way of obtaining the gain for correcting the output level of other regions Q1, Q3, and Q4 with the region Q2 of the CCD 1A as the reference region will now be explained.

(1) First, between two regions of region Q1 and region Q2, the first gain fgain1_Q21 and the second gain fgain2_Q21 for correcting the output level of the region Q1 are derived with the output level of the region Q2 as the reference through a method similar to the first embodiment.

(2) Next, between two regions of region Q2 and region Q3, the first gain fgain1_Q23 and the second gain fgain2_Q23 for correcting the output level of the region Q3 are derived with the output level of the region Q2 as the reference through a method similar to the first embodiment.

(3) Next, between two regions of region Q3 and region Q4, the first gain fgain1_Q34 and the second gain fgain2_Q34 for correcting the output level of the region Q4 are derived with the output level of the region Q3 as the reference through a method similar to the first embodiment.

(4) Since the first gain fgain1_Q34 and the second gain fgain2_Q34 for correcting the output level of the region Q4 obtained in (3) are gains having region Q3 as the reference, the gains must be converted to gains having region Q2 as the reference.

(5) Assuming the first gain for correcting the output level of the region Q4 with the region Q2 as the reference as fgain1_Q24, fgain1_Q24 is the product of the first gain fgain1_Q23 for correcting the output level of the region Q3 with the output level of the region Q2 as the reference, and the first gain fgain1_Q34 for correcting the output level of the region Q4 with the output level of the region Q3 as the reference. That is, fgain1_Q24=fgain1_Q23×fgain1_Q34.

Assuming the second gain for correcting the output level of the region Q4 with the region Q2 as the reference as fgain2_Q24, fgain2_Q24 is the product of the second gain fgain2_Q23 for correcting the output level of the region Q3 with the output level of the region Q2 as the reference, and the second gain fgain2_Q34 for correcting the output level of the region Q4 with the output level of the region Q3 as the reference. That is, fgain2_Q24=fgain2_Q23×fgain2_Q34.

The outputs levels of the regions Q1, Q3, and Q4 are corrected, similar to the first embodiment, using the first gain and the second gain with respect to regions Q1, Q3, and Q4 with region Q2 as the reference, derived as above.

It is to be noted that a gain deriving region smoothing circuit for reducing the noise in the region (gain deriving region) in the vicinity of the boundary of the adjacent divided regions may be provided in the previous stage of the gain deriving circuit 8A, as in the second embodiment.

What is claimed is:

1. A signal processing device comprising:
    an imaging element in which an imaging region is divided into two left and right regions, and an electric signal is read for each divided region;
    synthesis means for synthesizing the electric signal read from the imaging element to generate signals for one screen;
    gain deriving means for deriving a gain for one divided region defined in advance for each horizontal line in one screen based on the signals of a plurality of pixels near the boundary of the divided regions out of the signals for one screen generated by the synthesis means;
    average value deriving means for deriving an average value of the gain derived for each horizontal line in one screen by the gain deriving means; and
    correcting means for correcting a signal level difference between the both divided regions by multiplying the gain average value derived by the average value deriving means to the signal in one divided region defined in advance out of the signals for one screen output from the synthesis means; wherein
    the gain deriving means derives the gain by deriving, from the signals of two same filter pixels of one divided region, a predicted value of the signal of one same filter pixel of the other divided region based on the signals of a plurality of same color filter pixels near the boundary of the divided region for each horizontal line in one screen, and comparing the derived predicted value and an actual signal value of the relevant pixel.

2. The signal processing device as claimed in claim 1, wherein the gain deriving means comprises:
- first means for selecting signals of three continuing pixels of the same color filter from a total of eight pixels, four pixels on each region near the boundary of the divided region of one horizontal line in one screen;
- second means for deriving, from the signal of the two pixels belonging to one divided region out of the signals of three pixels selected by the first means, the predicted value of the signal of the pixel belonging to the other divided region;
- third means for deriving the gain for one divided region defined in advance based on the predicted value derived by the second means and the actual signal value of the pixel;
- fourth means for deriving the gain by repeatedly performing the processes same as the first means, the second means, and the third means on other combinations of three continuing pixels of the same color filter in the range of eight pixels of the horizontal line; and
- fifth means for performing processes similar to the first means to the fourth means on all the horizontal lines in one screen.

3. The signal processing device as claimed in claim 1, further comprising time direction smoothing means for smoothing the gain derived for every one screen by the gain deriving means in the time direction; wherein the correcting means corrects the signal level difference between the both divided regions using the gain obtained by the time direction smoothing means.

4. A signal processing device comprising:
- an imaging element in which an imaging region is divided into two left and right regions, and an electric signal is read for each divided region;
- synthesis means for synthesizing the electric signal read from the imaging element to generate signals for one screen;
- gain deriving means for deriving a gain for one divided region defined in advance for each horizontal line in one screen based on the signals of a plurality of pixels near the boundary of the divided regions out of the signals for one screen generated by the synthesis means;
- first average value deriving means for deriving an average value of the gain derived for each horizontal line in one screen by the gain deriving means;
- second average value deriving means for deriving an average value of the gain for the horizontal line in which a signal value of the pixel near the boundary of the divided region is less than or equal to a first predetermined value out of the gains derived for each horizontal line in one screen by the gain deriving means; and
- correcting means for correcting a signal level difference between the both divided regions by, out of the signals in one divided region defined in advance in the signals for one screen output from the synthesis means, multiplying the gain average value obtained by the second average value deriving means for the signal having the signal value of less than or equal to a second predetermined value, multiplying the gain average value obtained by the first average value deriving means for the signal having the signal value of greater than or equal to a third predetermined value greater than the second predetermined value, and multiplying a value obtained by weighing and adding the gain average value obtained by the first average value deriving means and the gain average value obtained by the second average deriving means according to the relevant signal value for the signal having the signal value between the second predetermined value and the third predetermined value; wherein the gain deriving means derives the gain by deriving, from the signals of two same filter pixels of one divided region, a predicted value of the signal of one same filter pixel of the other divided region based on the signals of a plurality of same color filter pixels near the boundary of the divided regions for each horizontal line in one screen, and comparing the derived predicted value and an actual signal value of the relevant pixel.

5. The signal processing device as claimed in claim 4, wherein the gain deriving means comprises:
- first means for selecting signals of three continuing pixels of the same color filter from a total of eight pixels, four pixels on each region near the boundary of the divided region of one horizontal line in one screen;
- second means for deriving, from the signal of the two pixels belonging to one divided region out of the signals of three pixels selected by the first means, the predicted value of the signal of the pixel belonging to the other divided region;
- third means for deriving the gain for one divided region defined in advance based on the predicted value derived by the second means and the actual signal value of the pixel;
- fourth means for deriving the gain by repeatedly performing the processes same as the first means, the second means, and the third means on other combinations of three continuing pixels of the same color filter in the range of eight pixels of the horizontal line; and
- fifth means for performing processes similar to the first means to the fourth means on all the horizontal lines in one screen.

6. The signal processing device as claimed in claim 4, further comprising time direction smoothing means for smoothing the gain derived for every one screen by the gain deriving means in the time direction; wherein the correcting means corrects the signal level difference between the both divided regions using the gain obtained by the time direction smoothing means.

* * * * *